United States Patent
Goldston et al.

(10) Patent No.: US 6,570,943 B2
(45) Date of Patent: May 27, 2003

(54) METHOD FOR EQUALIZATION OF COMPLEMENTARY CARRIERS IN AN AM COMPATIBLE DIGITAL AUDIO BROADCAST SYSTEM

(75) Inventors: Don Roy Goldston, Mason, OH (US); David Carl Hartup, West Chester, OH (US); Marcus McLenn Matherne, West Chester, OH (US)

(73) Assignee: Ibiquity Digital Corporation, Columbia, MD (US)

( * ) Notice: Subject to any disclaimer, the term of this patent is extended or adjusted under 35 U.S.C. 154(b) by 85 days.

(21) Appl. No.: 09/952,450

(22) Filed: Sep. 14, 2001

(65) Prior Publication Data

US 2002/0012392 A1 Jan. 31, 2002

Related U.S. Application Data

(62) Division of application No. 09/207,894, filed on Oct. 2, 1998, now Pat. No. 6,292,511.

(51) Int. Cl.⁷ .................................................. H04B 1/10
(52) U.S. Cl. ....................................... 375/350; 375/232
(58) Field of Search ................................ 375/260, 316, 375/350, 320, 268, 229, 234, 235, 232, 279, 280, 281, 261, 340, 329, 332, 346, 285; 381/2, 3, 15, 415; 370/208; 329/304, 347, 348, 349

(56) References Cited

U.S. PATENT DOCUMENTS

| 4,379,947 A | * | 4/1983 | Warner | 370/204 |
| 4,425,642 A | * | 1/1984 | Moses et al. | 370/477 |
| 4,534,054 A | * | 8/1985 | Maisel | 381/4 |

(List continued on next page.)

OTHER PUBLICATIONS

A.J. Vigil, "Wireless data transmission through in–band–on–channel Digital audio broadcasting", SPIE, vol. 2601, Jun. 1995, pp 105–114.*

(List continued on next page.)

Primary Examiner—Tesfaldet Bocure
(74) Attorney, Agent, or Firm—Robert P. Lenart, Esq.; Pietragallo, Bosick & Gordon

(57) ABSTRACT

A method is provided for equalizing an amplitude modulated compatible digital broadcasting signal which includes an amplitude modulated radio frequency signal having a first frequency spectrum, the amplitude modulated radio frequency signal having a first carrier modulated by an analog program signal, a plurality of digitally modulated carrier signals positioned within a bandwidth which encompasses the first frequency spectrum, a first group of the digitally modulated carrier signals including complementary signals and lying within the first frequency spectrum, and second and third groups of the digitally modulated carrier signals including non-complementary signals and lying outside of the first frequency spectrum. The method includes the steps of producing a first signal representative of in-phase components of the amplitude modulated compatible digital broadcasting signal; producing a second signal representative of quadrature-phase components of the amplitude modulated compatible digital broadcasting signal; using the first and second signals as the real and imaginary inputs to take the Fast Fourier Transform of the first and second signals to produce a plurality of transformed signals representative of frequency domain data; processing the transformed signals by multiplying the transformed signals by an equalization vector, with the equalization vector comprising a plurality of equalizer coefficients; and updating the equalizer coefficients used for the complementary signals by interpolating coefficients of the vector for the non-complementary signals. The invention also encompasses the operation of radio frequency receivers which utilize the above method, as well as apparatus that performs the above method and radio frequency receivers which utilize the above equalization method.

21 Claims, 4 Drawing Sheets

U.S. PATENT DOCUMENTS

| | | | | |
|---|---|---|---|---|
| 4,660,193 A | * | 4/1987 | Young et al. | 370/204 |
| 4,817,116 A | * | 3/1989 | Akaiwa et al. | 375/276 |
| 4,881,241 A | * | 11/1989 | Pommier et al. | 375/260 |
| 4,881,245 A | * | 11/1989 | Walker et al. | 375/260 |
| 5,020,076 A | * | 5/1991 | Cahill et al. | 375/216 |
| 5,117,195 A | * | 5/1992 | Robbins | 329/307 |
| 5,128,933 A | * | 7/1992 | Baranoff-Rossine | 370/483 |
| 5,134,630 A | * | 7/1992 | Bateman | 375/142 |
| 5,134,634 A | * | 7/1992 | Yoshida | 375/324 |
| 5,251,232 A | * | 10/1993 | Nonami | 375/216 |
| 5,274,629 A | * | 12/1993 | Helard et al. | 370/208 |
| 5,311,550 A | * | 5/1994 | Fouche et al. | 375/260 |
| 5,315,583 A | * | 5/1994 | Murphy et al. | 370/312 |
| 5,390,214 A | * | 2/1995 | Hopkins et al. | 375/259 |
| 5,406,551 A | * | 4/1995 | Saito et al. | 370/203 |
| 5,499,271 A | * | 3/1996 | Plenge et al. | 375/295 |
| 5,559,830 A | * | 9/1996 | Dapper et al. | 375/230 |
| 5,584,051 A | * | 12/1996 | Goken | 455/68 |
| 5,588,022 A | * | 12/1996 | Dapper et al. | 375/216 |
| 5,592,471 A | * | 1/1997 | Briskman | 455/506 |
| 5,606,576 A | * | 2/1997 | Dapper et al. | 375/268 |
| 5,633,896 A | * | 5/1997 | Carlin et al. | 375/340 |
| 5,673,292 A | * | 9/1997 | Carlin | 375/269 |
| 5,703,954 A | * | 12/1997 | Dapper et al. | 381/15 |
| 5,757,854 A | * | 5/1998 | Hunsinger et al. | 375/260 |
| 5,764,706 A | * | 6/1998 | Carlin et al. | 375/326 |
| 5,771,224 A | * | 6/1998 | Seki et al. | 370/206 |
| 5,809,065 A | * | 9/1998 | Dapper et al. | 375/216 |
| 5,949,796 A | * | 9/1999 | Kumar | 370/529 |
| 6,128,334 A | * | 10/2000 | Dapper et al. | 375/216 |
| 6,292,511 B1 | * | 9/2001 | Goldston et al. | 375/235 |
| 6,295,317 B1 | * | 9/2001 | Hartup et al. | 375/235 |
| 6,449,245 B1 | * | 9/2002 | Ikeda et al. | 370/208 |
| 6,452,977 B1 | * | 9/2002 | Goldston et al. | 375/260 |
| 6,480,536 B2 | * | 11/2002 | Hartup et al. | 375/235 |

OTHER PUBLICATIONS

D. Funderburk et al., A Digital Receiver Design for AM Stereo Signals Using Compatible Quadrature Amplitude Modulation 920083, Motorola Inc., (no date), p 7.*

Kroeger, B Vigil, A., "Improved IBOC DAB Technology for AM and FM Broadcasting", Oct. 1996.*

M. Alard, R. Lassale, "Principles of Modulation and Channel Coding for Digital Broadcasting for Mobile receivers", EBU Review, No. 224, pp. 168–190, Aug. 1987.*

Kroeger, B.W., Peyla, P.J., "Robust IBOC DAB AM and FM Technology for Digital Audio Broadcasting", Apr. 1997.*

Hartup, D.C. Alley, D.M., Goldston, D.R., "AM Hybrid IBOC DAB System", Sep. 1997.*

Michael Chrysochoos et al., "Performance of an In–Band Adjacent–Channel DAB System for Frequency–Selective Rayleigh and Ricean slow Fading Channel under Analog FM interference," IEEE, pp. 243–249, 1998.*

* cited by examiner

METHOD FOR EQUALIZATION OF COMPLEMENTARY CARRIERS IN AN AM COMPATIBLE DIGITAL AUDIO BROADCAST SYSTEM

CROSS REFERENCE TO RELATED APPLICATION

This application is a divisional application of application Ser. No. 09/207,894, filed Oct. 2, 1998, now issued as U.S. Pat. No. 6,292,511, on Nov. 18, 2001.

BACKGROUND OF THE INVENTION

This invention relates to radio broadcasting and, more particularly, to methods of and apparatus for equalizing the demodulated signal in a receiver for an amplitude modulated compatible digital broadcasting system.

There has been increasing interest in the possibility of broadcasting digitally encoded audio signals to provide improved audio fidelity. Several approaches have been suggested. One such approach, set forth in U.S. Pat. No. 5,588,022, teaches a method for simultaneously broadcasting analog and digital signals in a standard AM broadcasting channel. An amplitude modulated radio frequency signal having a first frequency spectrum is broadcast. The amplitude modulated radio frequency signal includes a first carrier modulated by an analog program signal. Simultaneously, a plurality of digitally modulated carrier signals are broadcast within a bandwidth which encompasses the first frequency spectrum. Each of the digitally modulated carrier signals is modulated by a portion of a digital program signal. A first group of the digitally modulated carrier signals lies within the first frequency spectrum and is modulated in quadrature with the first carrier signal. Second and third groups of the digitally modulated carrier signals lie outside of the first frequency spectrum and are modulated both in-phase and in-quadrature with the first carrier signal.

The waveform in the AM compatible digital audio broadcasting system described in U.S. Pat. No. 5,588,022, was been formulated to provide sufficient data throughput for the digital signal while avoiding crosstalk into the analog AM channel. Multiple carriers are employed by means of orthogonal frequency division multiplexing (OFDM) to bear the communicated information.

Monophonic detectors for consumer AM radios respond only to the envelope and not the phase of the received signal. Because of the use of the multiple digitally modulated carriers, there is a need for a means to reduce the envelope distortion caused by this hybrid signal. U.S. patent application Ser. No. 08/671,252, assigned to the assignee of the present invention, discloses a method for reducing envelope distortion in an AM compatible digital audio broadcasting system. Certain digital carriers that are above the frequency of the analog AM carrier have an associated digital carrier that is at an equal frequency offset below the analog AM carrier. The data and modulation placed on the upper digital carrier and its counterpart are such that the signal resulting from their addition has no component that is in-phase with the analog AM carrier. Digital carrier pairs arranged in this way are said to be complementary. This configuration delivers dramatic fidelity improvements to analog AM reception of AM compatible digital broadcast signals.

At the receiver, the digital signal is demodulated by means of a Fast Fourier Transform (FFT). One possible method and associated apparatus is described in U.S. Pat. No. 5,633,896. That patent discloses a demodulation technique which minimizes the undesired crosstalk between the analog signal and the digital signals in an AM compatible digital audio broadcasting (AM DAB) system using an orthogonal frequency division multiplexed (OFDM) modulation format, by employing dual fast Fourier transform processes on separate respective in-phase and quadrature-phase components of a received OFDM digital signal. The output of the quadrature channel is used to recover the complementary data, and the resultant processed component signals are summed to recover the non-complementary data.

The received multi-carrier signal requires equalization in the presence of dynamic channel response variations. Without such equalization, a very distorted signal would be detected and the digital broadcasting signal information would be unrecoverable. An equalizer enhances the recoverability of the digital audio broadcasting signal information. One such equalizer is disclosed in U.S. Pat. No. 5,559,830. The equalizer disclosed therein includes means for receiving an AM compatible digital audio broadcasting waveform and storing that waveform as a waveform vector. The equalizer then processes that waveform by multiplying the waveform vector by an equalization vector. This equalization vector comprises a plurality of equalizer coefficients, each of the coefficients initially set to a predetermined value. The equalizer then compares each location of the processed waveform vector with a stored waveform vector. The equalizer selects as the signal that vector location closest to the stored waveform vector. Preferably, the equalizer includes means for updating the equalizer coefficients using the waveform vector, the processed waveform vector, and the stored waveform vector to provide immunity to noise.

In the equalizers of both U.S. Pat. Nos. 5,633,896 and 5,559,830, frequency domain information is presented to the equalizer as a frequency domain vector. Each block of frequency domain information is stored in a storage array. This storage array vector is multiplied by a plurality of equalizer coefficients. The resulting product of this multiplication is the equalized signal. A set of exact values is known a priori in the equalizer against which each vector location of the equalized signal can be compared. The ideal value closest to that described in the vector location is chosen as the actual signal value. The vector of decisions is stored in a decision array. Using the received signal, the equalized signal and decision array, an equalizer coefficient estimator calculates coefficient estimates. The rate of coefficient update determines equalizer noise immunity and convergence rate. Coefficients in different parts of the band may be updated at different rates depending on knowledge of the distortion mechanism. U.S. Pat. Nos. 5,633,896 and 5,559,830 are hereby incorporated by reference.

While the dual FFT technique can improve system performance in a channel that has symmetric magnitude and anti-symmetric phase about the AM carrier frequency over the frequency range of the complementary carriers, for channels with non-symmetric magnitude or non- anti-symmetric phase, the process of combining the complementary carrier FFT outputs destroys the non-symmetric magnitude and non- anti-symmetric phase information and the signal that drives the equalizer is not correct. There exists a need for a demodulation method which can preserve non-symmetric magnitude and non- anti-symmetric phase information in such circumstances. The present invention seeks to provide an improved equalization method and receivers which include the method.

SUMMARY OF THE INVENTION

The present invention provides a method of estimating the equalizer coefficients for the complementary carriers while still retaining the benefits of combining the information from the complementary carrier FFT outputs. The method uses information from the non-complementary carriers to estimate, via interpolation, the equalizer coefficients for the complementary carriers.

The equalization method of the present invention is used to process an amplitude modulated compatible digital broadcasting signal including an amplitude modulated radio frequency signal having a first frequency spectrum, the amplitude modulated radio frequency signal having a first carrier modulated by an analog program signal, a plurality of digitally modulated carrier signals positioned within a bandwidth which encompasses the first frequency spectrum, a first group of the digitally modulated carrier signals including complementary carriers and lying within the first frequency spectrum, and second and third groups of the digitally modulated carrier signals including non-complementary carriers and lying outside of the first frequency spectrum. The method comprises the steps of producing a first signal representative of in-phase components of the amplitude modulated compatible digital broadcasting signal; producing a second signal representative of the quadrature-phase components of the amplitude modulated compatible digital broadcasting signal; using the first and second signals as the real and imaginary inputs to take the Fast Fourier Transform of the first and second signals to produce a plurality of transformed signals representative of frequency domain data; processing said transformed signals by multiplying the transformed signals by an equalization vector, the equalization vector comprising a plurality of equalizer coefficients; and updating the equalizer coefficients used for the complementary signals by interpolating coefficients of the vector for the non-complementary signals.

The invention also encompasses the operation of radio frequency receivers which utilize the above method, as well as apparatus that performs the above method and radio frequency receivers which include the apparatus.

BRIEF DESCRIPTION OF THE DRAWINGS

The invention will be more readily apparent to those skilled in the art by reference to the accompanying drawings wherein.

DETAILED DESCRIPTION OF THE PREFERRED EMBODIMENTS

This invention provides a method for equalizing carriers in a broadcast signal which includes both an analog amplitude modulated signal and a digital signal on the same channel assignment as the existing analog AM broadcasting allocation. The technique of broadcasting the digital signal in the same channel as an analog AM signal is called in-band on-channel (IBOC) broadcasting. This broadcasting is accomplished by transmitting a digital waveform by way of a plurality of orthogonal frequency division modulated (OFDM) carriers, some of which are modulated in-quadrature with the analog AM signal and are positioned within the spectral region where the standard AM broadcasting signal has significant energy. The remaining digital carriers are modulated both in-phase and in-quadrature with the analog AM signal and are positioned in the same channel as the analog AM signal, but in spectral regions where the analog AM signal does not have significant energy. In the United States, the emissions of AM broadcasting stations are restricted in accordance with Federal Communications Commission (FCC) regulations to lie within a signal level mask defined such that: emissions 10.2 kHz to 20 kHz removed from the analog carrier must be attenuated at least 25 dB below the unmodulated analog carrier level, emissions 20 kHz to 30 kHz removed from the analog carrier must be attenuated at least 35 dB below the unmodulated analog carrier level, and emissions 30 kHz to 60 kHz removed from the analog carrier must be attenuated at least [35 dB+1 dB/kHz] below the unmodulated analog carrier level.

Figure 1:
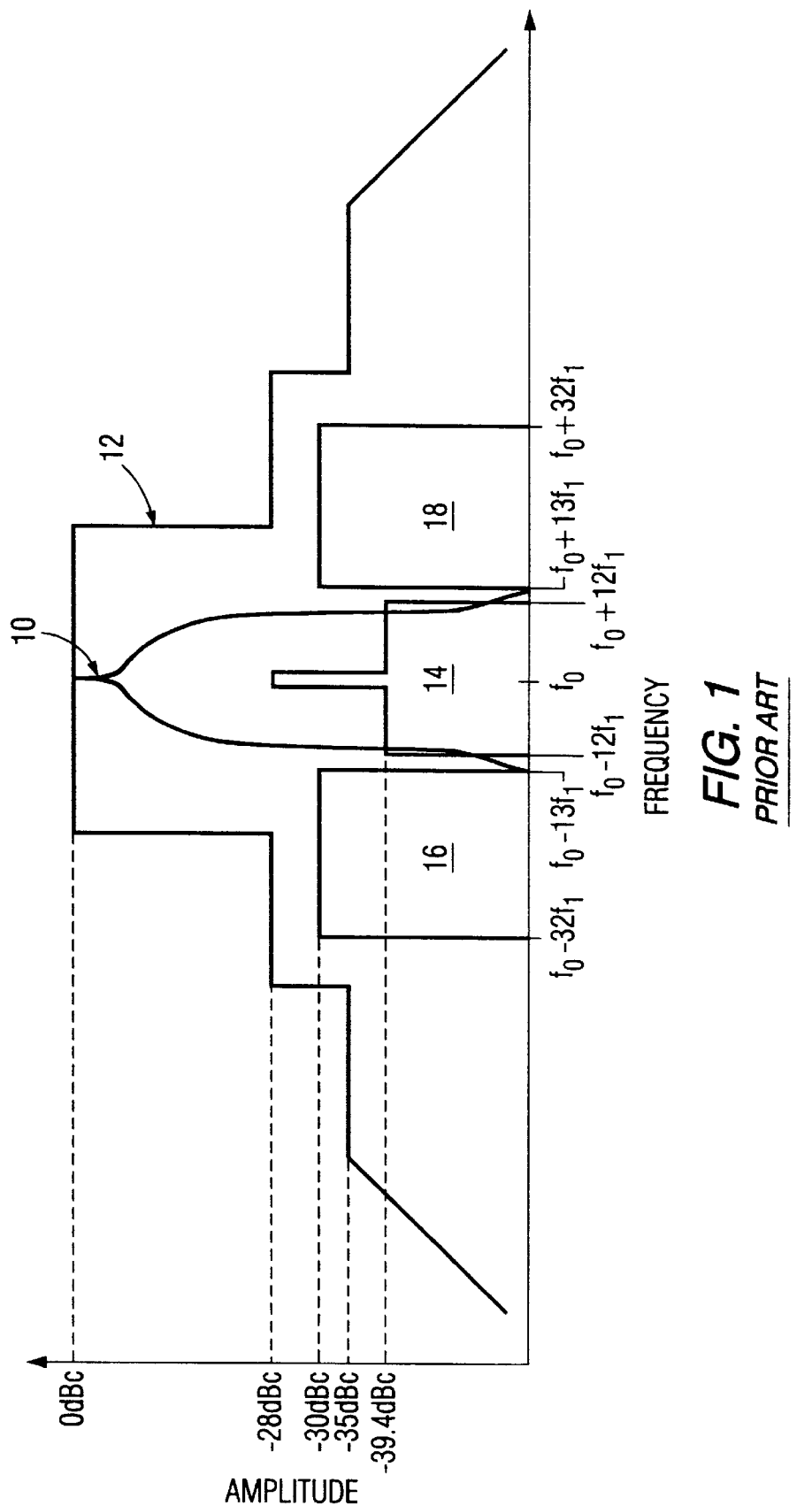
FIG. 1 is a diagrammatic representation of a prior art composite analog AM and digital broadcasting signal having carriers positioned in accordance with the present invention.

FIG. 1 shows the spectrum of an AM digital audio broadcasting signal of a type which can be utilized by the present invention. Curve 10 represents the magnitude spectrum of a standard broadcasting amplitude modulated signal, wherein the carrier has a frequency of $f_0$. The FCC emissions mask is represented by item number 12. The OFDM waveform is composed of a series of data carriers spaced at $f_1 = 59.535 \cdot 10^6/(131072)$, or about 454 Hz. A first group of twenty four of the digitally modulated carriers are positioned within a frequency band extending from $(f_0 - 12 f_1)$ to $(f_0 + 12 f_1)$, as illustrated by the envelope labeled 14 in FIG. 1. Most of these signals are placed 39.4 dB lower than the level of the unmodulated AM carrier signal in order to minimize crosstalk with the analog AM signal. Crosstalk is further reduced by encoding this digital information in a manner that guarantees orthogonality with the analog AM waveform. This type of encoding is called complementary encoding (i.e. complementary BPSK, complementary QPSK, or complementary 32 QAM) and is more fully described in the previously discussed copending U.S. Pat. No. 5,859,876. Complementary BPSK modulation is employed on the innermost digital carrier pair at $f_0 \pm f_1$ to facilitate timing recovery. These carriers are set at a level of −28 dBc. All other carriers in this first group have a level of −39.4 dBc and are modulated using complementary 32 QAM for the 48 and 32 kbps encoding rates. Complementary 8 PSK modulation is used on carriers ranging from $(f_0 - 11 f_1)$ to $(f_0 - 2 f_1)$ and from $(f_0 + 2f_1)$ to $(f_0 + 11 f_1)$ for the 16 kbps encoding rate. For all three encoding rates, the carriers at $(f_0 - 12 f_1)$ and $(f_0 + 12 f_1)$ carry supplementary data and may be modulated using complementary 32 QAM.

Additional groups of digital carriers are placed outside the first group. The need for these digital waveforms to be in-quadrature with the analog signal is eliminated by restricting the analog AM signal bandwidth. The carriers in a second and a third group, encompassed by envelopes 16 and 18 respectively, may be modulated using, for example, 32 QAM for the 48 and 32 kbps rates, and 8 PSK for the 16 kbps rate. The carriers are set at levels of −30 dBc for all encoding rates.

Figure 2:
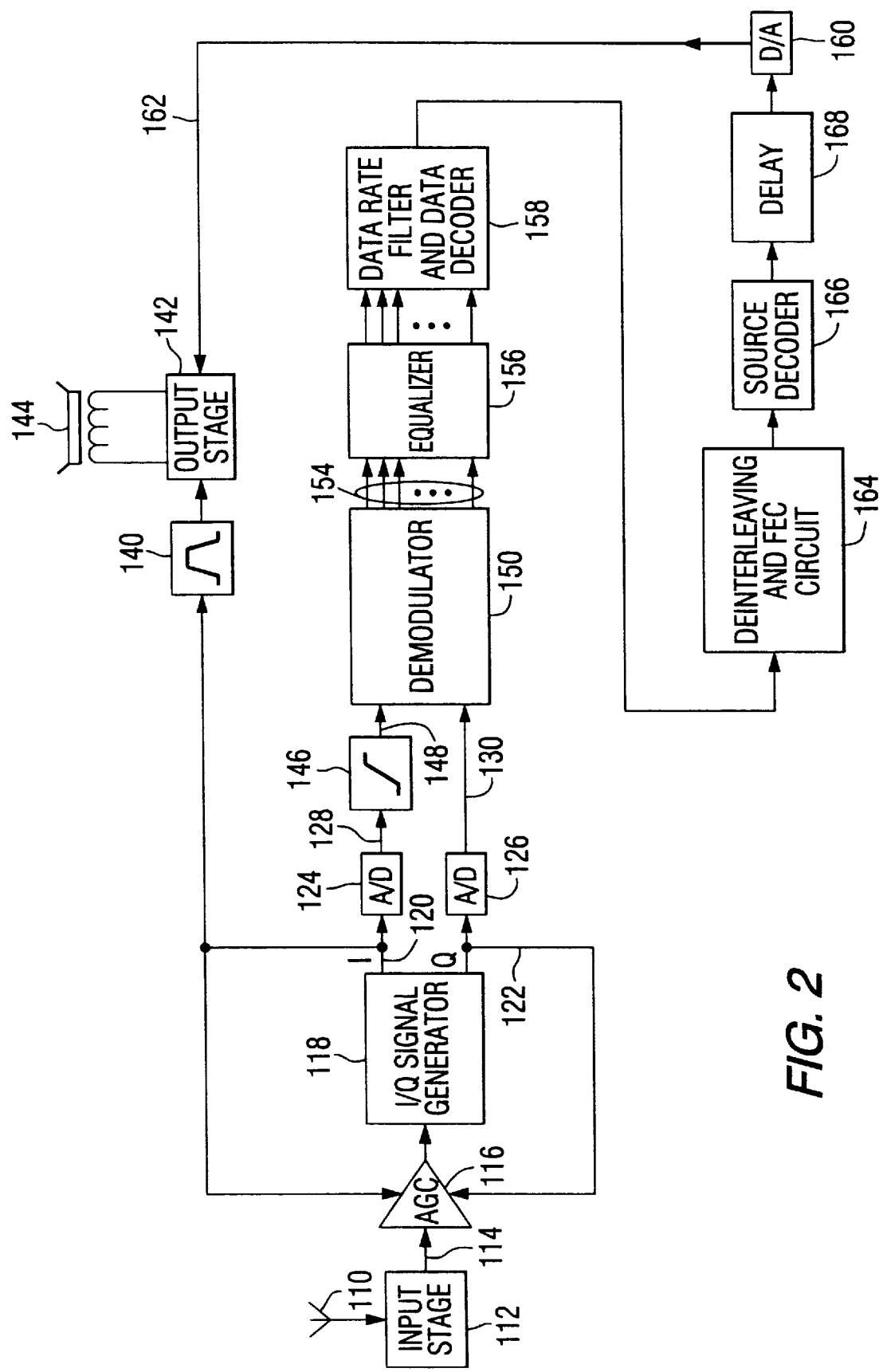
FIG. 2 is a block diagram of a receiver which may include an equalizer that operates in accordance with this invention.

FIG. 2 is a block diagram of a receiver constructed to receive the composite digital and analog signals of FIG. 1. An antenna 110 receives the composite waveform containing the digital and analog signals and passes the signal to conventional input stages 112, which may include a radio frequency preselector, an amplifier, a mixer and a local oscillator. An intermediate frequency signal is produced by the input stages on line 114. This intermediate frequency signal is passed through an automatic gain control circuit 116 to an I/Q signal generator 118. The I/Q signal generator produces an in-phase signal on line 120 and a quadrature signal on line 122. The in-phase channel output on line 120 is input to an analog-to-digital converter 124. Similarly, the quadrature channel output on line 122 is input to another analog-to-digital converter 126. Feedback signals on lines 120 and 122 are used to control the automatic gain control circuit 116. The signal on line 120 includes the analog AM signal which is separated out as illustrated by block 140 and passed to an output stage 142 and subsequently to a speaker 144 or other output device.

An optional highpass filter 146 may be used to filter the in-phase components on line 128 to eliminate the energy of the analog AM signal and to provide a filtered signal on line 148. If the highpass filter is not used, the signal on line 148 is the same as that on line 128. A demodulator 150 receives the digital signals on lines 148 and 130, and produces output signals on lines 154. These output signals are passed to an equalizer 156 and to a data rate filter and data decoder 158. To obtain higher signal-to-noise ratios (SNR) for the complementary carriers, the FFT outputs for pairs of complementary carriers are combined. The output of the data decoder is sent to a deinterleaving circuit and forward error correction decoder 164 in order to improve data integrity. The output of the deinterleaver/forward error correcting circuit is passed to a source decoder 166. The output of the source decoder is delayed by circuit 168 to compensate for the delay of the analog signal at the transmitter and to time align analog and digital signals at the receiver. The output of delay circuit 168 is converted to an analog signal by a digital-to-analog converter 160 to produce a signal on 162 which goes to the output stage 142.

Figure 3:
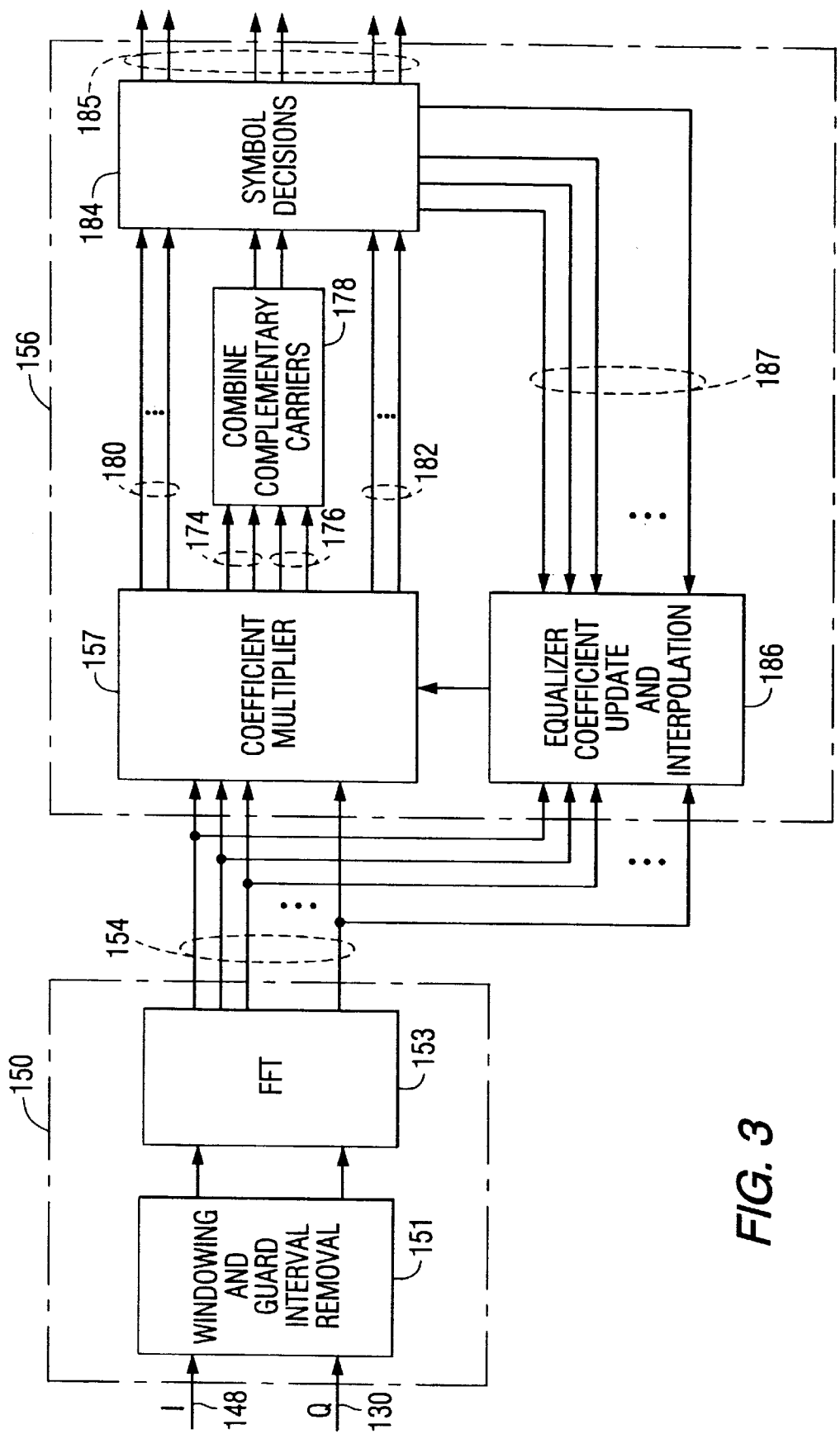
FIG. 3 is a functional block diagram which illustrates the operation of a demodulator and adaptive equalizer in accordance with this invention.

FIG. 3 is a functional block diagram which illustrates the operation of a demodulator 150 and an adaptive equalizer 156 in accordance with the present invention. Both in-phase (I) and quadrature (Q) signals are provided on lines 148 and 130 as inputs to a windowing and guard interval removal circuit. These signals may be provided by using down converter elements similar to those shown in FIG. 2. The window should be applied such that the digital carriers remain orthogonal, or at least the lack of orthogonality among the digital carriers is small enough not to impact system performance. A method of applying a window that preserves orthogonality among the carriers has been developed. In a specific implementation of the method, a root-raised cosine window is applied at the transmitter and receiver. For this window, the tapering occurs on the first and last seven samples of the 135 samples in a baud. After the window has been applied at the receiver, the last seven samples are added to the first seven samples, where the 129the sample is added to the first sample, the 130the sample is added to the second sample, and this pattern continues with the 135the sample being added to the seventh sample. The resulting 128 points are input to an FFT. In some cases it may be advantageous to perform the windowing and guard band removal operations prior to processing by highpass filter 146. The outputs from the windowing and guard interval removal circuit 151 are input to the FFT 153. The output of the FFT is input by way of lines 154 to the coefficient multiplier 157. The coefficient multiplier operates on the frequency domain data and adjusts the magnitude and phase of each OFDM carrier to counteract the effects of channel perturbations, transmitter and receiver filters, the transmit and receive antennas, and other factors and processing that affect the magnitude and phase of the signal. At the outputs 174 and 176 of the coefficient multiplier, the information for pairs of the complementary carriers is combined as illustrated by block 178. Specifically, this may be accomplished by taking the average of the frequency domain data for each pair of complementary carriers, where the negative conjugate of the frequency domain data for one of the carriers is used. Combining the complementary carrier information in this manner results in increased signal-to-noise ratios for the complementary carriers. This combined information for the complementary carriers, as well as the coefficient multiplier outputs on lines 180 and 182 for the non-complementary carriers is input to a processor 184 that determines which of the frequency domain constellation points was transmitted. These decisions, along with the pre-equalized constellation points and the previous values of the equalizer coefficients are used to update the equalizer coefficients as illustrated by block 186. Block 186 can utilize a known algorithm such as the least mean squares (LMS) or recursive least squares (RLS) to update the equalizer coefficients. The output of equalizer 156 of FIG. 2 can consist of the combination of the outputs on lines 174, 176, 180, and 182, or it can consist of the output of the symbol decisions processing 185, where lines 185 contain decisions for the complementary and non-complementary carriers. The output used depends on the type of data required for further processing, which may especially depend on the type of FEC used in the system.

U.S. Pat. No. 5,559,830, issued Sep. 24, 1996 describes one mode of operation for an equalizer having an equalizer coefficient update algorithm. The present invention enhances the operation of the equalizer and equalizer coefficient update algorithm by considering the effects that occur when the equalizer coefficients should have non-symmetric magnitude or non- anti-symmetric phase about the center of the FFT.

Figure 4:
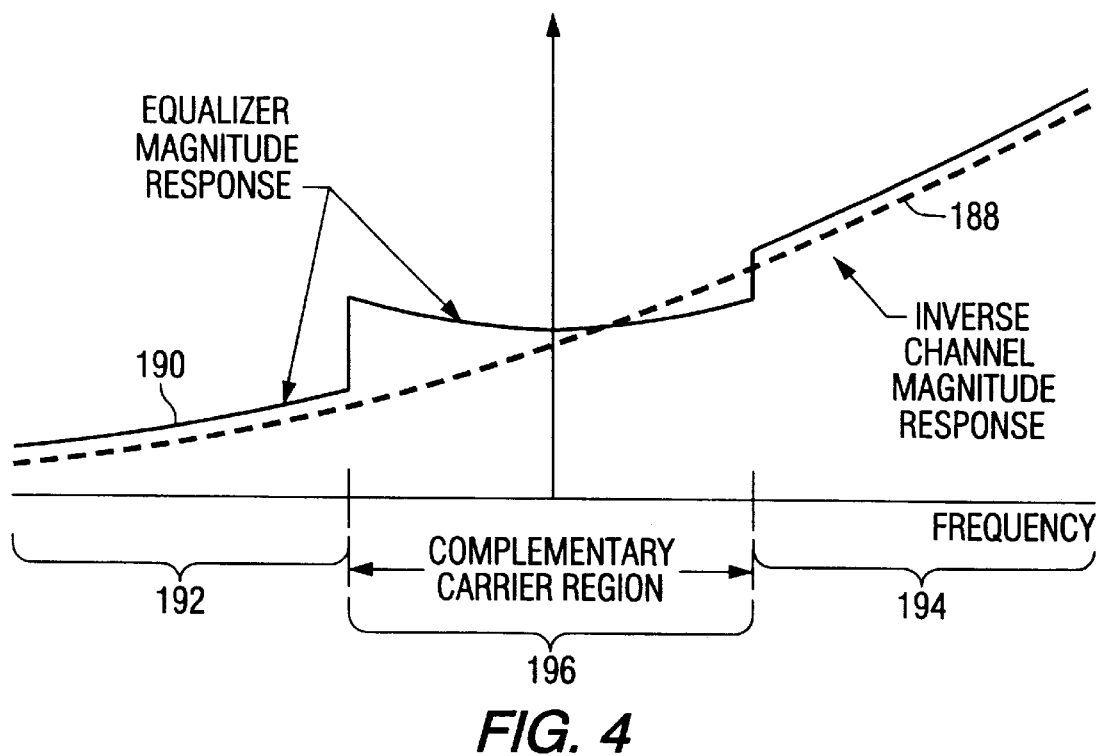
FIGS. 4 and 5 are diagrams showing the magnitude of responses of the equalizer.

If the in-phase input to the FFT is highpass filtered to eliminate the analog signal, the output of the FFT, which is input to the equalizer coefficient update algorithm, has certain symmetry properties. Specifically, since the in-phase part of the FFT input has nearly zero energy for the complementary carriers, the output of the FFT will be have nearly anti-hermitian symmetry for the complementary carriers. The output of the symbol decision processor for the complementary carriers will have the same property. Since these two anti-hermitian signals serve as the input to the equalizer coefficient update routine, the equalizer coefficients will be constrained to have a magnitude response that is symmetric and a phase response that is anti-symmetric about the center frequency of the FFT. Therefore, the equalizer coefficients will not converge to the proper values when the equalizer coefficients should have non-symmetric magnitude or non-anti-symmetric phase about the center of the FFT. FIG. 4 illustrates an example of this situation. For the case shown in FIG. 4, it is assumed that the channel magnitude response is not symmetric about the center frequency of the FFT. FIG. 4 actually shows the inverse of the channel response 188 because this is the desired response for the equalizer. The response 190 that would be obtained from the equalizer magnitude is also shown in FIG. 4. For clarity, the illustrated equalizer response is displaced upward slightly so it can be distinguished from the inverse channel response. Note that the response follows the inverse channel response in the regions 192 and 194 of the non-complementary carriers. However, the equalizer response is not correct in the region 196 of the complementary carriers because it is forced to have a symmetric magnitude response in this spectral region.

If the highpass filter is not used on the in-phase signal to eliminate the analog signal prior to the FFT, the FFT output for the non-complementary carriers could be noisy due to leakage of the analog signal into the non-complementary carriers that are closest to the analog AM carrier frequency. In addition, when the equalizer coefficients should have symmetric magnitude and anti-symmetric phase about the analog AM carrier, the lack of a highpass filter leads to noisier estimates of the equalizer coefficients for the complementary carriers than when a highpass filter is used. Also, if the equalizer coefficients should have non-symmetric magnitude or non- anti-symmetric phase about the analog AM carrier frequency, estimation of the equalizer coefficients for the complementary carriers becomes difficult because the analog signal and complementary carriers are no longer separated into the in-phase and quadrature-phase components, respectively. Long term averaging could be used to obtain the proper equalizer coefficients for static phenomenon that require the equalizer coefficients to have non-symmetric magnitude or non- anti-symmetric phase about the center of the FFT. However, channel perturbations frequently have non-symmetric magnitude or non- anti-symmetric phase about the center of the FFT. These perturbations are transient in nature and occur too rapidly to be corrected by long term averaging.

Therefore, whether or not a highpass filter is used to eliminate the analog signal, the equalizer coefficients for the complementary carriers will not be useful when the ideal equalizer coefficients for the complementary carriers should have a non-symmetric magnitude or non- anti-symmetric phase about the center of the FFT.

Figure 5:
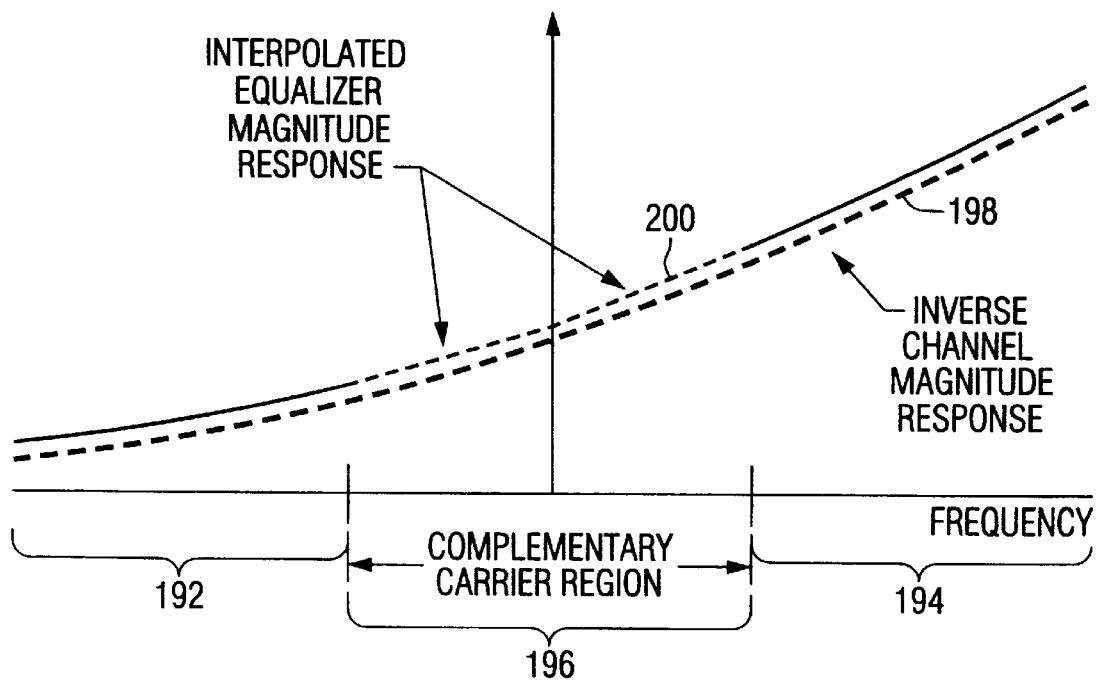

Interpolation of the equalizer coefficients across the complementary region can be used to overcome this disadvantage. If the control loops of the receiver such as the automatic gain control (AGC), carrier tracking, and symbol tracking are at the proper values, the center frequency of the FFT should be at a known, constant magnitude and phase. Therefore, the information from the spectral regions 192 and 194 outside of the complementary carrier region 196 can be used to interpolate and estimate the proper equalizer coefficients for the complementary carriers. In reference to FIG. 3, the processing when interpolation is used is implemented in the following manner. The coefficient multiplier 157 outputs the equalized signals for the non-complementary carriers on lines 180 and 182 and equalized signals for the complementary carriers on lines 174 and 176. The symbol decisions processor 184 outputs decisions for only the non-complementary carriers on lines 187, in contrast to the case where interpolation is not used and lines 187 include the decisions for the complementary carriers. The equalizer coefficient update circuit 186 updates the coefficients for the non-complementary carriers. Then the coefficients for the complementary carriers are updated by interpolation using the known value at the center of the channel and the values of the coefficients for the non-complementary carriers. FIG. 5 shows an example where linear interpolation is used to determine the equalizer coefficients across the center of the channel. As can be seen, if the channel response 198 is relatively smooth, the interpolated equalizer coefficients are near to the ideal values and the equalizer magnitude response 200 closely follows the inverse channel magnitude response.

Several variations of interpolation are possible. For example, the value of the equalizer coefficient for the first OFDM carriers outside of the complementary region could be used to linearly interpolate from their values to the value at the center of the channel. Linear interpolation has been found to be satisfactory in the large majority of cases where the signal is in the commercial AM broadcast band (530 kHz to 1710 kHz) and the width of the complementary region is less than 10 kHz. As an alternative, it may be desirable to use non-complementary carriers that are further away from the center of the channel if the non-complementary carrier or carriers that are located closest to the complementary carrier region are affected by filters such as the highpass filter that can be used to eliminate the analog signal from the in-phase portion of the received signal. Also, information from many of the non-complementary carriers could be used in the interpolation process. Interpolation algorithms other than linear could be used. Some of the well known interpolation algorithms include cubic spline, polynomial interpolation, FFT based interpolation, and exponential or logarithmic curve fitting. The non-complementary equalizer coefficients used for the interpolation and the complementary equalizer coefficients obtained from the interpolation can be averaged over time to reduce the effects of noise. Smoothing across frequency can also be used to reduce the effects of noise. Instead of interpolating the linear magnitude of the coefficients, interpolation on a log magnitude scale may be advantageous. Alternatively, instead of interpolating the magnitude and phase of the equalizer coefficients, it may be desirable to interpolate the corresponding real and imaginary components of the coefficients (or Cartesian coordinates) that can be used to represent the equalizer coefficients.

This invention provides a system for adaptively equalizing an amplitude modulated compatible digital audio broadcast signal. In the foregoing specification certain preferred practices and embodiments of this invention have been set out, however, it will be understood that the invention may be otherwise embodied within the scope of the following claims.

What is claimed is:

1. A method of equalizing a composite signal including a first group of complementary digitally modulated carrier signals within a first frequency spectrum, and second and third groups of non-complementary digitally modulated carrier signals positioned outside of the first frequency spectrum, said method comprising the steps of:

taking the Fast Fourier Transform a first signal representative of in-phase components of the composite signal, and a second signal representative of quadrature-phase components of the composite signal to produce a plurality of transformed signals representative of frequency domain data;

processing said plurality of transformed signals by multiplying said plurality of transformed signals by an equalization vector, said equalization vector comprising a plurality of equalizer coefficients; and updating said equalizer coefficients used for the complementary signals by interpolation using coefficients of said vector for the non-complementary signals.

2. The method of claim 1 wherein said coefficients of said vector for the non-complementary signals are interpolated using one of: linear interpolation, cubic spline interpolation, polynomial interpolation, Fast Fourier transform based interpolation, or logarithmic curve fitting.

3. The method of claim 1 wherein said interpolation is averaged over time.

4. The method of claim 1 wherein said interpolation results in linear changes to the magnitude and phase of the coefficients as a function of frequency.

5. The method of claim 1 wherein said interpolation results in logarithmic changes to the magnitude of the coefficients.

6. The method of claim 1 wherein said interpolation is performed on the magnitude and phase of the coefficients.

7. The method of claim 1 wherein said interpolation is performed on real and imaginary components of the coefficients.

8. An apparatus for equalizing a composite signal including a first group of complementary digitally modulated carrier signals within a first frequency spectrum, and second and third groups of non-complementary digitally modulated carrier signals positioned outside of the first frequency spectrum, said apparatus comprising:

means for taking the Fast Fourier Transform a first signal representative of in-phase components of the composite signal, and a second signal representative of quadrature-phase components of the composite signal to produce a plurality of transformed signals representative of frequency domain data;

means for processing said plurality of transformed signals by multiplying said plurality of transformed signals by an equalization vector, said equalization vector comprising a plurality of equalizer coefficients; and means for updating said equalizer coefficients used for the complementary signals by interpolation using coefficients of said vector for the non-complementary signals.

9. The apparatus of claim 8, wherein said coefficients of said vector for the non-complementary signals are interpolated using one of: linear interpolation, cubic spline interpolation, polynomial interpolation, Fast Fourier transform based interpolation, or logarithmic curve fitting.

10. The apparatus of claim 8, wherein said interpolation is averaged over time.

11. The apparatus of claim 8, wherein said interpolation results in linear changes to the magnitude and phase of the coefficients as a function of frequency.

12. The apparatus of claim 8, wherein said interpolation results in logarithmic changes to the magnitude of the coefficients.

13. The apparatus of claim 8, wherein said interpolation is performed on the magnitude and phase of the coefficients.

14. The apparatus of claim 8, wherein said interpolation is performed on real and imaginary components of the coefficients.

15. An apparatus for equalizing a composite signal including a first group of complementary digitally modulated carrier signals within a first frequency spectrum, and second and third groups of non-complementary digitally modulated carrier signals positioned outside of the first frequency spectrum, said apparatus comprising:

a demodulator for taking the Fast Fourier Transform a first signal representative of in-phase components of the composite signal, and a second signal representative of quadrature-phase components of the composite signal to produce a plurality of transformed signals representative of frequency domain data; and a processor for processing said plurality of transformed signals by multiplying said plurality of transformed signals by an equalization vector, said equalization vector comprising a plurality of equalizer coefficients, and for updating said equalizer coefficients used for the complementary signals by interpolation using coefficients of said vector for the non-complementary signals.

16. The apparatus of claim 15, wherein said coefficients of said vector for the non-complementary signals are interpolated using one of: linear interpolation, cubic spline interpolation, polynomial interpolation, Fast Fourier transform based interpolation, or logarithmic curve fitting.

17. The apparatus of claim 15, wherein said interpolation is averaged over time.

18. The apparatus of claim 15, wherein said interpolation results in linear changes to the magnitude and phase of the coefficients as a function of frequency.

19. The apparatus of claim 15, wherein said interpolation results in logarithmic changes to the magnitude of the coefficients.

20. The apparatus of claim 15, wherein said interpolation is performed on the magnitude and phase of the coefficients.

21. The apparatus of claim 15, wherein said interpolation is performed on real and imaginary components of the coefficients.

* * * * *

UNITED STATES PATENT AND TRADEMARK OFFICE
CERTIFICATE OF CORRECTION

PATENT NO. : 6,570,943 B2
DATED : May 27, 2003
INVENTOR(S) : Don Roy Goldston, David Carl Hartup and Marcus McLenn Matherne It is certified that error appears in the above-identified patent and that said Letters Patent is hereby corrected as shown below:

Column 5,
Line 52, "129the" should read -- 129th --.
Line 52, "130the" should read -- 130th --.
Line 54, "135the" should read -- 135th --.

Signed and Sealed this

Twenty-sixth Day of October, 2004

JON W. DUDAS
*Director of the United States Patent and Trademark Office*